United States Patent [19]

Blum et al.

[11] 4,109,311

[45] Aug. 22, 1978

[54] INSTRUCTION EXECUTION MODIFICATION MECHANISM FOR TIME SLICE CONTROLLED DATA PROCESSORS

[75] Inventors: Arnold Blum, Gechingen; Horst von der Heyden, Boeblingen; Fritz Irro, Boeblingen; Stephan Richter, Boeblingen; Helmut Schaal, Dettenhausen; Hermann Schulze-Schoelling, Gaertringen, all of Fed. Rep. of Germany

[73] Assignee: International Business Machines Corporation, Armonk, N.Y.

[21] Appl. No.: 725,757

[22] Filed: Sep. 23, 1976

[30] Foreign Application Priority Data

Dec. 12, 1975 [DE] Fed. Rep. of Germany ....... 2555963

[51] Int. Cl.² ............................................. G06F 9/19
[52] U.S. Cl. ............................ 364/200; 179/15 BA
[58] Field of Search ................ 364/200, 200 MS File, 364/900, 900 MS File; 179/15 BA

[56] References Cited

U.S. PATENT DOCUMENTS

| 3,470,540 | 9/1969 | Levy | 340/172.5 |
|---|---|---|---|
| 3,573,852 | 4/1971 | Wastson et al. | 340/172.5 |
| 3,718,912 | 2/1973 | Hasbrouck et al. | 340/172.5 |
| 3,766,524 | 10/1973 | Maring et al. | 340/172.5 |
| 3,781,814 | 12/1973 | Deerfield | 340/172.5 |
| 3,868,649 | 2/1975 | Sato et al. | 340/172.5 |
| 3,940,741 | 2/1976 | Horikoshi et al. | 340/172.5 |
| 3,949,380 | 4/1976 | Barbour et al. | 340/172.5 |

*Primary Examiner*—Mark E. Nusbaum
*Attorney, Agent, or Firm*—Cyril A. Krenzer; Richard E. Bee

[57] ABSTRACT

An instruction execution modification mechanism is described for a digital data processor wherein multiple programs or tasks are performed in a concurrent manner by means of a time slice mechanism which causes the instructions from the different programs to be executed in an interleaved manner. Instructions from the different programs are executed during different successive time slice intervals. The instruction execution modification mechanism is responsive to the occurrences of various predetermined conditions in the data processing system for selectively modifying the normal execution of different ones of the instructions in different ones of the programs. To this end, there is provided a program list mechanism listing the modifiable programs, an instruction list mechanism listing the modifiable instructions and a modification storage mechanism for storing modification signals for the different instructions. If, during a given time slice interval, the program to be executed is on the modifiable program list and the instruction to be executed is on the modifiable instruction list and the appropriate condition is occurring in the data processing system, then the modification storage mechanism is enabled to send the modification signals for this instruction to the instruction execution unit for modifying the normal execution of this instruction.

6 Claims, 7 Drawing Figures

INSTRUCTION EXECUTION MODIFICATION MECHANISM FOR TIME SLICE CONTROLLED DATA PROCESSORS

BACKGROUND OF THE INVENTION

This invention relates to digital data processors and digital data processing systems which employ a time slicing mechanism for enabling concurrent execution of multiple programs.

In a time slice controlled data processor, the operating time of the instruction execution unit is subdivided into a recurring set of time slice intervals. Where the different programs are to be accorded equal treatment, the first time slice in the set is assigned to a first program, the second time slice is assigned to a second program, the third time slice is assigned to a third program, etc. During any given time slice, one or two or a few instructions from the assigned program are executed. In this manner, the instructions from the different programs are executed in an interleaved manner and the different programs appear to be concurrently executed.

Representative time slice controlled data processors are described in U.S. Pat. No. 3,766,524, granted Oct. 16, 1973 and entitled "Dynamic Time Slicing Control for Microprogrammed Controller" and in German Patent No. 2,247,735, granted Feb. 19, 1976 and entitled "Circuit Arrangement for Allocating Tasks in a Computer".

The time slice multiprogramming technique is particularly useful in connection with so-called small-scale or low-performance data processors. It enables a favorable improvement in the cost/performance ratio of such processors. Typical examples of small-scale low-performance processors are the so-called miniprocessors and microprocessors which are receiving a considerable amount of current publicity.

Another technique that can be used to improve the cost/performance ratio of a small-scale data processor is a so-called instruction execution modification or function modification technique whereby, under certain conditions, particular instructions are interpreted and executed in other than the normal manner. This technique can be used to provide increased programming capability and flexibility without increasing the size of the instruction set. As is known, increasing the size of the instruction set increases the amount of hardware and hence the cost of the processor. Conversely, it can be used to enable a given degree of programming capability to be obtained with an instruction set of smaller size. For the case of microprograms and microinstructions, for example, this function modification technique enables a greater amount of control function to be provided without increasing either the width or the number of microinstructions. Thus, more control functions can be provided without increasing the size or cost of the control storage mechanism.

As can be appreciated from the foregoing remarks, it would be very desirable to use both the time slicing technique and the function modification technique in connection with small-scale, low-performance data processors. Unfortunately, the two techniques are not very well suited for use with one another. In particular, it is generally very difficult to apply the instruction execution modification or function modification technique to a time sliced controlled processor without decreasing the flexibility and usefulness of the time slicing and, at the time, unduly increasing the cost and complexity of the processor hardware.

SUMMARY OF THE INVENTION

It is an object of the invention, therefore, to provide a new and improved mechanism for enabling instruction execution modification or function modification to be accomplished in time slice controlled data processors in an economical and reliable manner.

It is a further object of the invention to provide a new and improved mechanism for increasing the programming flexibility and capability in small-scale time slice controlled data processors without increasing the size of their instruction set.

In accordance with the invention, in a data processing system having an instruction storage mechanism for storing instructions belonging to a plurality of different programs and an instruction execution mechanism for receiving and executing the stored instructions one at a time, there is provided a time slice control mechanism for controlling the sequence in which the instructions are supplied to the execution mechanism for causing the instructions from the different programs to be executed in an interleaved manner. There is further provided a function modification mechanism coupled to the time slice control mechanism and responsive to the occurrence of a predetermined condition in the data processing system for modifying the normal execution of at least one of the instructions in a predetermined one of the programs.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENT

By way of definition, the term "processor" is used herein and in the appended claims as a generic term to denote a genus which includes a species thereof the terms "digital computer", "digital controller", "data processor", "miniprocessor", "microprocessor" and the like. The term "instruction" is used herein and in the appended claims as a generic term to denote a genus which includes as species thereof the terms "microinstruction", "machine instruction", "macroinstruction", "assembler instruction" and the like. With these definitions in mind, the term "program" is used herein and in the appended claims to denote a set of one or more instructions that will cause a processor to perform a desired function or task.

Figure 1:
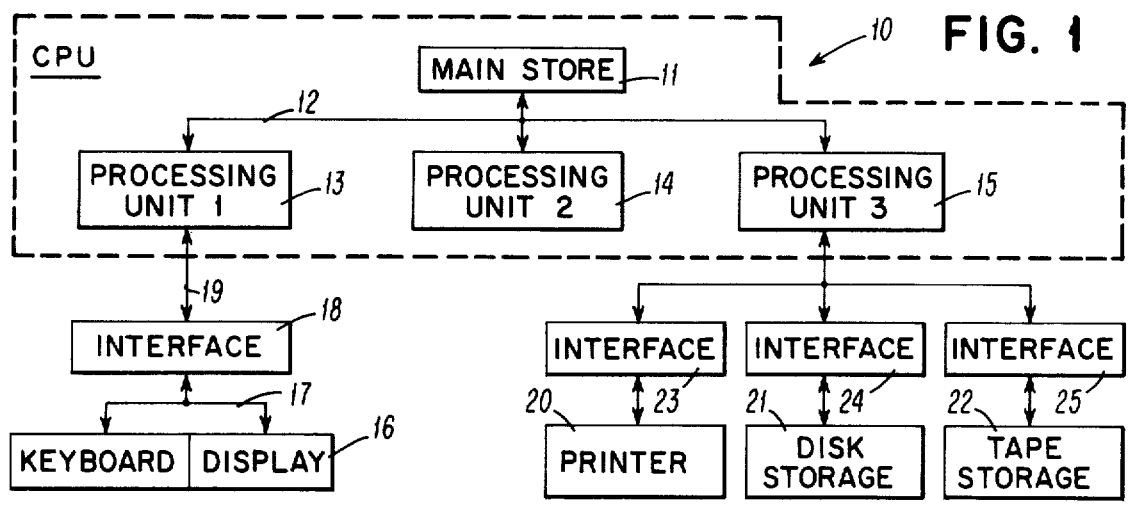
FIG. 1 is a high-level block diagram of a typical data processing system in which the present invention can be used to good advantage.

Referring to FIG. 1, there is shown a typical digital data processing system wherein the present invention may be applied to advantage. This system includes a central processing unit (CPU) 10 having a modular form of construction. As such, the CPU 10 includes a main storage unit 11 which is connected by way of multiconductor buses 12 to several processing units 13, 14 and 15 which carry out different functions of the CPU. Processing unit 13, for example, controls peripheral input/output (I/O) devices located in a keyboard and display unit 16. This I/O unit 16 is connected to the processing unit 13 by way of multiconductor bus 17, interface unit 18 and multiconductor bus 19. The second processing unit 14 is used, for example, to execute the problem-oriented programs located into the main storage unit 11 by the user. The third processing unit 15 is used, for example, to control different additional I/O devices represented by a printer 20, a disk storage unit 21 and a tape storage unit 22. I/O devices 20, 21 and 22 are connected to the processing unit 15 by way of interface units 23, 24 and 25, respectively.

Assuming the CPU 10 to be a small-scale low-performance data processor, the tasks to be handled are best carried out in the processing units 13, 14 and 15 in the multiprogramming mode since, in this manner, the cost/performance ratio obtained is altogether more favorable. This cost/performance ratio is further favorably influenced by performing the multiprogramming mode by means of the above-discussed time slicing technique. In other words, each of the processing units 13, 14 and 15 should be constructed to perform time slice multiprogramming. With this type of time slice control, each program in a given processing unit is sequentially allocated time slices for the duration of which all the resources of the processing unit are made available to one program. For the duration of the subsequent time slice, the processing unit is exclusively available to the next program in the sequence.

The time slices in any given processing unit can be allocated either rigidly, that is, the machine time available is divided equally among the different programs, or dynamically, that is, the program with the highest priority or the program requiring the greatest amount of processing time is allocated a greater number of time slices at the expense of low priority programs or programs requiring less processing time.

Figure 2:
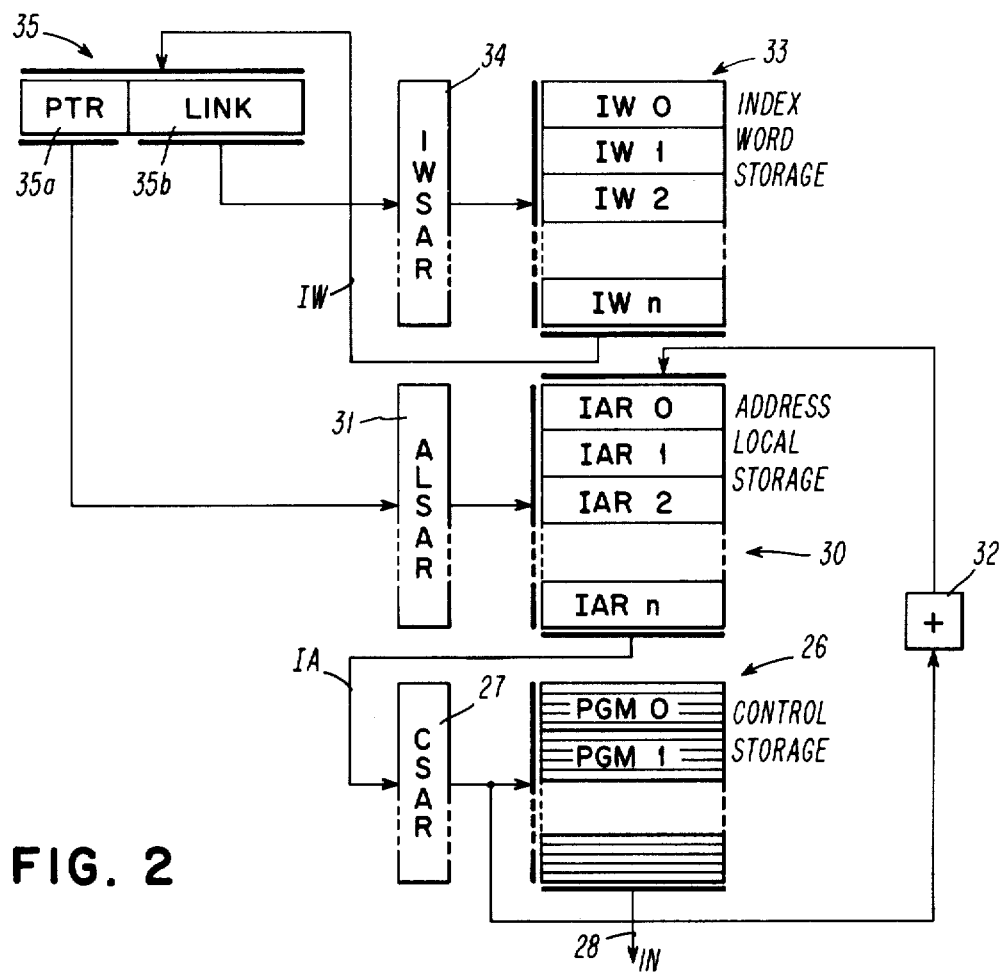
FIGS. 2 and 3 are block diagrams used in explaining the construction and operation of a time slice control mechanism used in a representative embodiment of the present invention.

The representative embodiment of the invention to be described herein will show how the invention can be applied to the processing unit 13 and the interface unit 18 and I/O unit 16 which are connected thereto. Initially, it is helpful to consider the time slice control mechanism by itself. To this end, FIG. 2 shows the primary features of the time slice control mechanism used in the processing unit 13. Also, at this point it should be noted that the representative embodiment of the invention described herein is specifically directed to the case of microprograms and microinstructions. As such, the processing unit 13 includes a control storage 26 having a relatively large number of storage locations which are individually addressable by means of a control store address register (CSAR) 27. (For sake of simplicity, the address decoders connected in between the address registers and the storage units will not be referred to in this application.) A plurality of control programs or microprograms for controlling the devices located in I/O unit 16 are stored in the control storage 26. Each microprogram is comprised of a series of microinstructions which are read out one at a time for purposes of deriving the elemental control signals which control the data flow control gates and functional units in the processing unit 13. The individual microprograms are designated as program zero (PGM 0), program one (PGM 1), etc.

An address local storage 30 is provided to enable the time slicing of a plurality of different programs which are capable of being handled independently of each other. Address local storage 30 includes a plurality of instruction address registers (IAR 0, IAR 1, etc.) which are individually addressable by means of an address local storage address register (ALSAR) 31. A separate instruction address register (IAR) is provided for each microprogram in the control storage 26. Each IAR contains the instruction address (IA) of the next microinstruction to be read out of the microprogram to which the IAR is assigned. Thus, for example, the address in IAR 0 is supplied to CSAR 27 to read out the next microinstruction in PGM 0. At the same time, the address in CSAR 27 is updated by an incrementer 32 and this updated address is stored back into IAR 0 to enable the addressing of the next following microinstruction in PGM 0 at the appropriate time. Thus, the IAR's function as instruction counters for the different microprograms in the control storage 26.

An index word storage 33 is provided for enabling the variable allocation of processing time (hereinafter sometimes referred to as "computing time") among the different microprograms in the control storage 26. Index word storage 33 stores a plurality of index words (IW 0, IW 1, etc.), there being a separate index word (IW) for each of the different time slice intervals in the complete time slice cycle. The index words are individually addressable by means of an index word storage address register (IWSAR) 34 which operates to read out one index word at a time. After an index word is read out of the index word storage 33, it is set into an index word buffer 35.

As indicated by the fields 35a and 35b in the index word buffer 35, each index word contains a plural-bit pointer (PTR) and a plural-bit link address (LINK). The pointer is a program identifier that identifies which of the microprograms in control storage 26 is assigned to the next time slice interval, that is, the time slice interval which is to follow the currently executing time slice interval. The information bits in this program pointer are transferred to ALSAR 31 to cause a read out of the instruction address register for the program assigned to the next time slice. This instruction address is then fed to the CSAR 27 to cause a read out from control storage 26 during the next time slice interval of the microinstruction to be executed during such time slice interval.

The second part of the index word in the index word buffer 35, namely, the LINK field, contains the address of the index word to be used next. By means of this link address, the program allocations can be strung together in any desired order. This link address is supplied to IWSAR 34 to cause the index word desired for the next time slice to be read out of the index word storage 33.

This next index word, which also includes a program pointer field and a link address field, is then set into the index word buffer 35 to replace the current index word.

The index word storage 33 is preferably designed in such a manner that the number of index words it can store exceeds the number of microprograms that can be performed independently of each other in the processing unit 13. In this manner, a relatively large index word storage 33 permits the available computing time to be allocated most effectively. If, for example, four programs are provided for a processing unit and if a string of sixteen index words is chosen, then each program or microprogram can occupy anywhere from one-sixteenth to thirteen-sixteenths of the total computing time. If it happens that one or two of the programs are not required for a short period of time, then the computing time can be allocated among the remaining programs. Also, the individual programs can automatically add to or reduce their share of the computing time. When a program adds to its computing time, the additional time is taken from one or more of the other programs which, at that moment, are being executed under uncritical time conditions.

Figure 3:
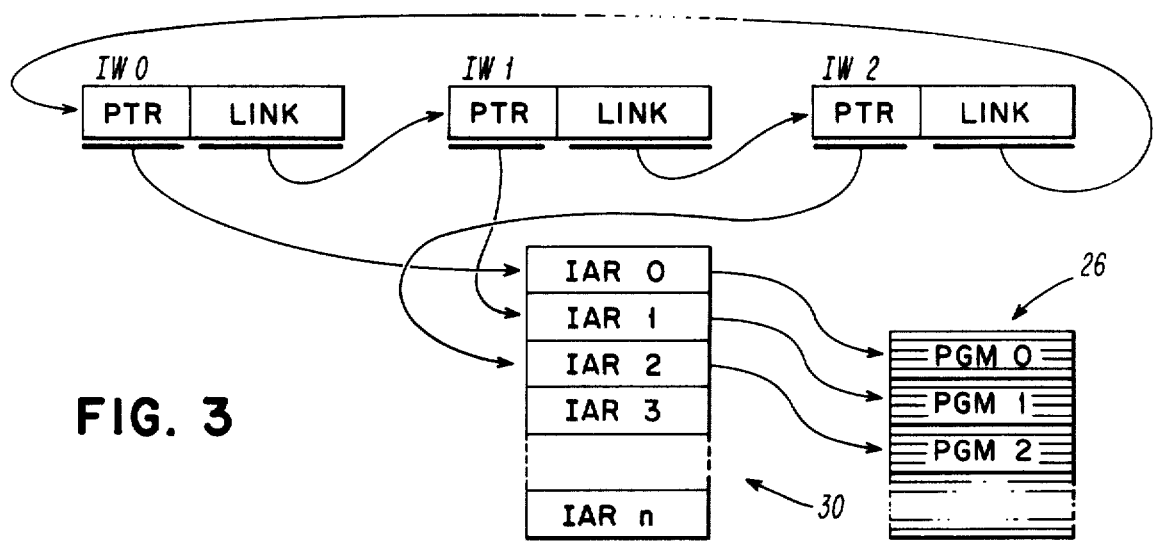

FIG. 3 summarizes the operation of the time slice mechanism. A first index word IW 0 addresses a first instruction address register IAR 0 which, in turn, addresses a first microinstruction in a first microprogram PGM 0. The link address portion of the first index word IW 0 then points to the next index word IW 1 which, in its turn, addresses the instruction address register IAR 1 for the next program and the instruction address therein addresses the desired microinstruction in the next microprogram PGM 1. In this manner, microinstructions from the different programs are read out of control storage 26 in a sequential and interleaved manner. The last index word in the sequence causes a return to the first index word IW 0 to start another time slice cycle. Thus, each traversal of the index word loop constitutes one time slice cycle and each time slice cycle is subdivided into a number of time slice intervals which is equal to the number of index words in the index word loop.

As is apparent, the index words can be strung together in any desired order and, if desired, the pointer for a given program can appear more than once in the loop. Thus, considerable flexibility is afforded for the implementation of the time slice mechanism and, since a revised set of index words can be loaded into the index word storage 33, the time slicing action can be readily modified to meet the needs of the particular I/O devices to be controlled by the processing unit.

Figure 4:
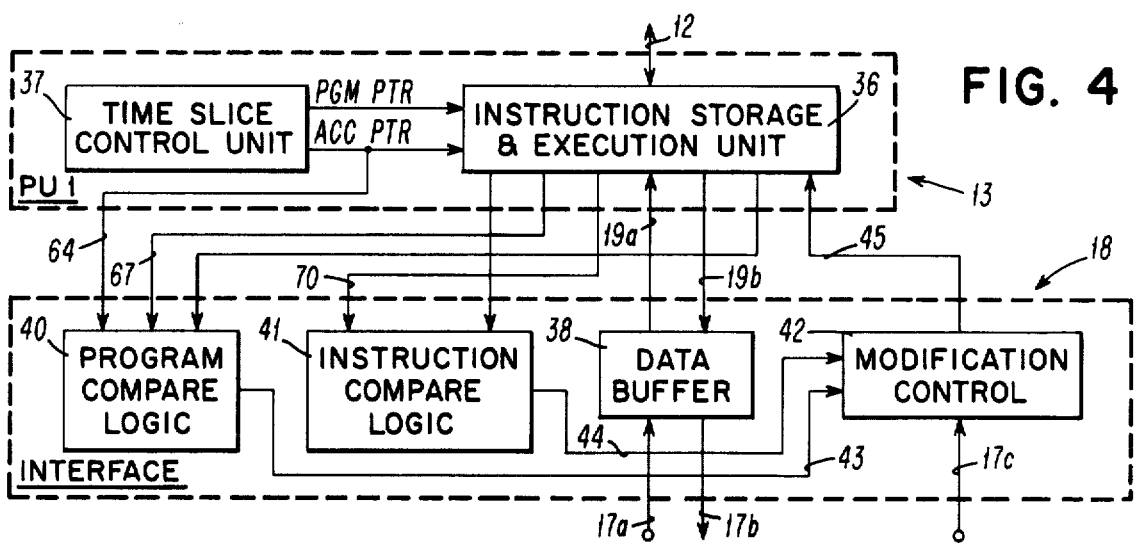
FIG. 4 is an intermediate-level block diagram showing the application of a representative embodiment of the present invention to the data processing system of FIG. 1.

Referring now to FIG. 4, there is shown, in a high-level manner, a representative embodiment of apparatus for accomplishing both dynamic time slicing and dynamic instruction execution modification or function modification. The function modification mechanism is responsive to the occurrences of various predetermined conditions in the data processing system for modifying the normal execution of different ones of the microinstructions in different ones of the microprograms. The determination of which instructions to modify and when to modify them is dependent on the occurrences of various system operating conditions which can occur at unpredictable times and in an unpredictable order or sequence.

As indicated in FIG. 4, the processing unit 13 includes an instruction storage and execution unit 36 wherein is located the previously considered control storage 26 which stores the microinstructions to be executed. Time slicing is accomplished by means of a time slice control unit 37 which supplies to the execution unit 36 a program pointer (PGM PTR) and an access pointer (ACC PTR). A primary difference between these pointers is that the program pointer points to the program for the currently executing time slice and the access pointer points to the program for the next following time slice.

The interface unit 18 includes a data buffer 38 which is used for transferring data from the processing unit 13 to the I/O unit 16 and vice versa. This is accomplished by means of conductor groups 17a, 17b, 19a and 19b in the unit interconnecting buses 17 and 19. The interface 18 also includes part of the function modification mechanism. In particular, it includes program compare logic 40, instruction compare logic 41 and a modification control 42. Modification control 42 receives the condition signals representing the occurrences of the predetermined operating conditions in the system. For sake of the present example, it is assumed that these condition signals are "external" condition signals received from the I/O unit 16 by way of conductor group 17c in the bus 17. It should be clearly understood, however, that the modification control 42 can also respond to various "internal" condition signals supplied thereto by the execution unit 36 and representing the occurrences of various internal operating conditions in such execution unit 36.

If, in addition to the appropriate condition signal, the modification control 42 receives a signal from program compare logic 40 by way of line 43 and a signal from instruction compare logic 41 by way of line 44, then modification control 42, in turn, sends a function modification control signal to the execution unit 36 by way of line 45 (part of bus 19). This function modification signal causes the normal execution of the current microinstruction to be modified.

Figure 6:
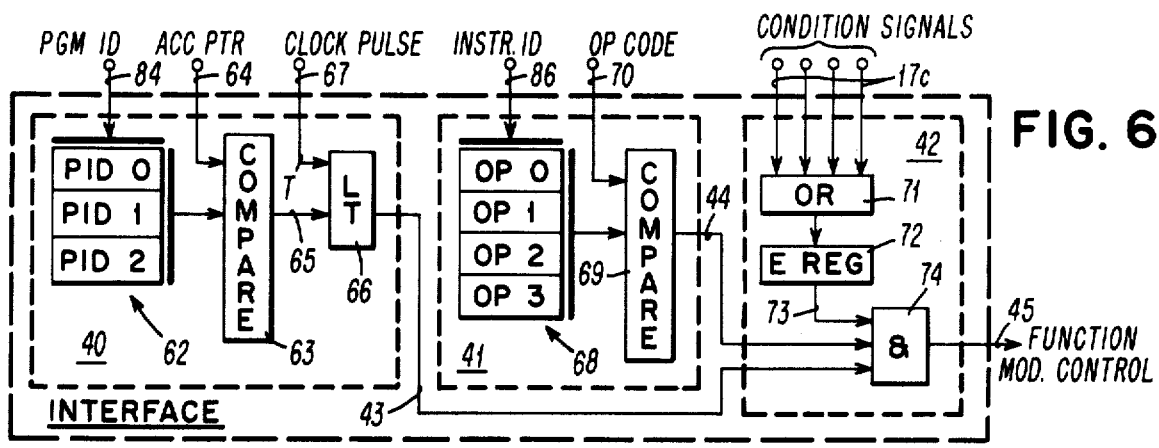
FIG. 6 is a block diagram showing in greater detail the construction of the interface portion of FIG. 4 insofar as it relates to the present invention.
Figure 5:
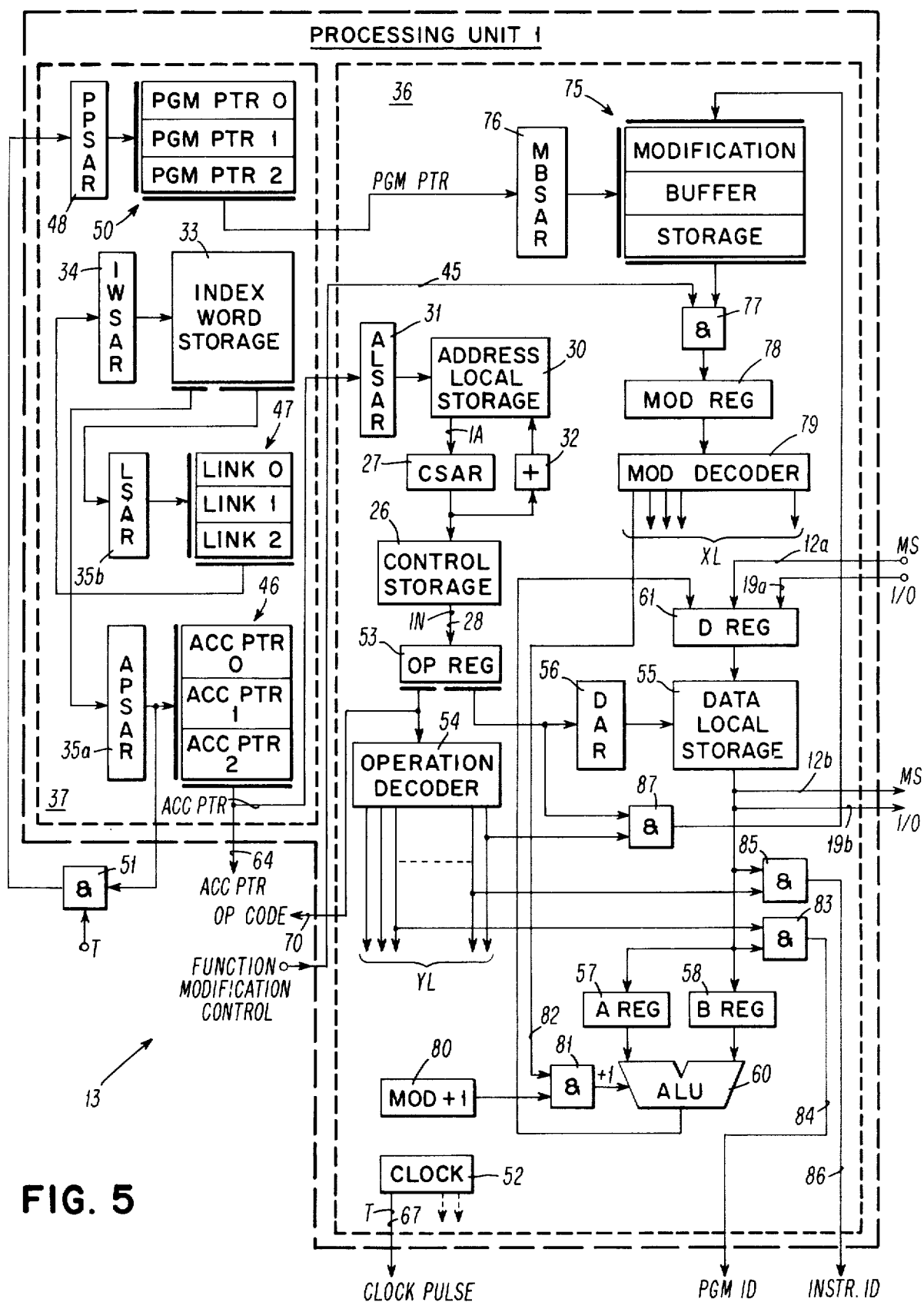
FIG. 5 is a block diagram showing in greater detail the construction of the processing unit portion of FIG. 4.
Figure 7:
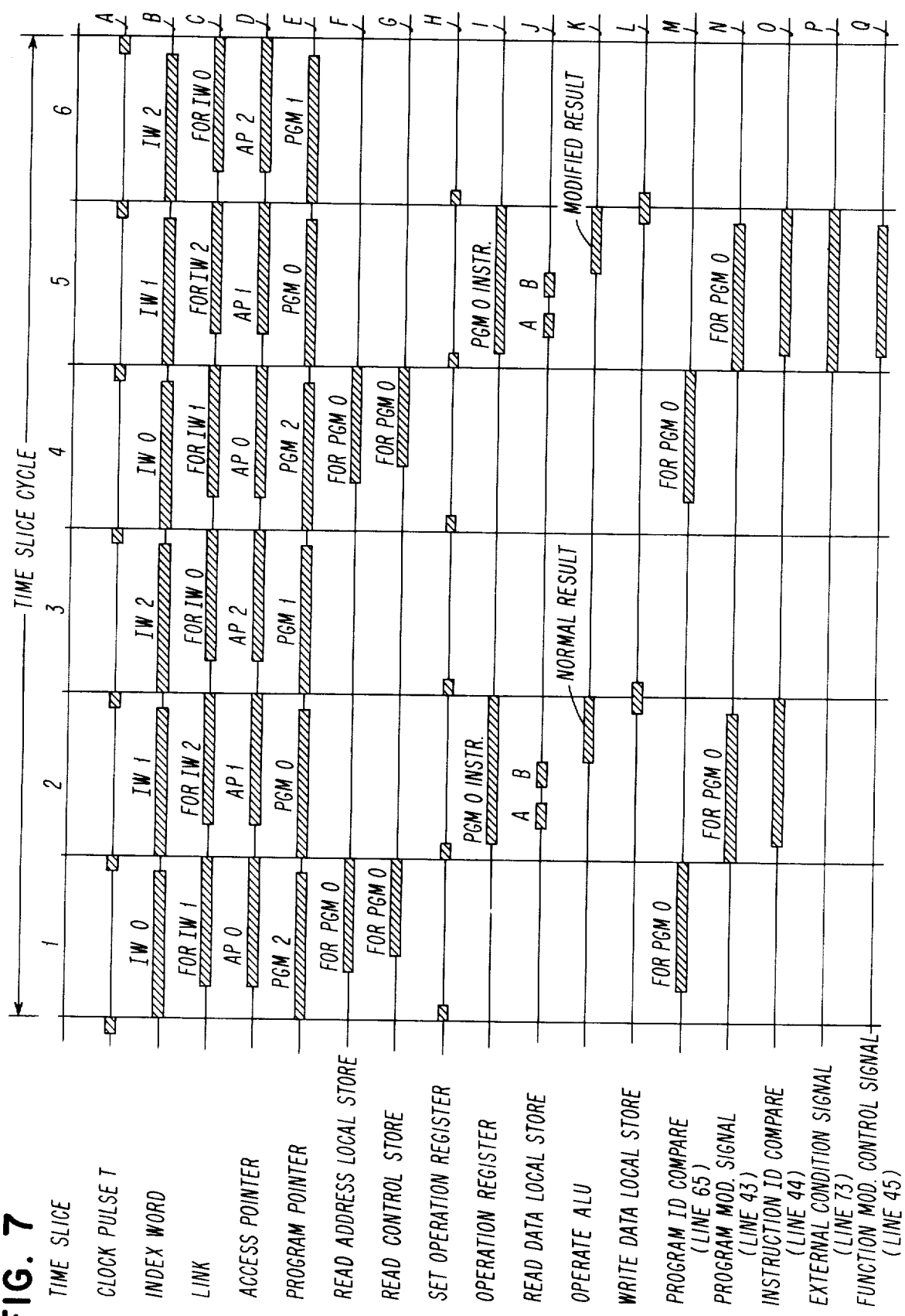
FIG. 7 is a timing diagram which is useful in explaining the operation of the mechanisms shown in FIGS. 5 and 6.

FIG. 5 shows in greater detail the construction of the processing unit 13 and FIG. 6 shows in greater detail the construction of the function modification portion of the interface unit 18. FIG. 7 is a timing diagram for FIGS. 5 and 6. For sake of example and as indicated in FIG. 7, it is assumed that each time slice cycle is subdivided into six time slice intervals and that the control storage 26 includes three different programs which need to be executed. For simplicity of explanation, it is assumed that the computer time is divided equally among the three programs and that the three programs are serviced in numerical order by the time slices. Thus, each program is serviced twice during the assumed six slice time slice cycle.

With reference to FIG. 5, one index word at a time is read out of the index word storage 33. The pointer portion of the index word is set into an access pointer storage address register (APSAR) 35a to cause the read out of a particular access pointer from an access pointer storage 46. At the same time, the link address portion of the index word is set into a link storage address register (LSAR) 35b to read out a particular link address from a link storage 47. APSAR 35a and LSAR 35b are equivalent to the two parts of the index word buffer 35 previously considered.

Just prior to the commencement of the instruction execution phase for the program in question, the index word pointer in APSAR 35a is set into a program pointer storage address register (PPSAR) 48 for causing a read out of a particular program pointer in a program pointer storage 50. This program pointer identifies the program whose microinstruction is being executed by the execution unit 36. The index word pointer in APSAR 35a is supplied to PPSAR 48 by way of AND gate circuitry 51 which is activated just prior to the commencement of the execution phase by a clock pulse T from clock pulse generator 52. At this same point in time, the link address being read out of link storage 47 is set into IWSAR 34 to commence the preparation for the next following time slice.

The access pointer read out of access storage 46 is set into ALSAR 31 to address a particular instruction address register in the address local storage 30. The instruction address obtained from this particular instruction address register is then set into CSAR 27 to address a particular microinstruction in the control storage 26. The addressed microinstruction is read out and set into an operation register 53. The control field portion of the microinstruction in operation register 53 is supplied to an operation decoder 54 which, in response thereto, produces the elemental control signals YL which control the various circuits and data flow control gates in the execution unit 36. For sake of simplicity, the data flow control gates, which control the movement of data on the data flow buses, are not shown, except for a few which are used for special purposes and which will be considered hereinafter.

The presence of a particular microinstruction in the operation register 53 corresponds to the execution phase for such microinstruction. With reference to FIG. 7, it is seen that the execution phase for a particular microinstruction occurs one time slice after what might be termed the "accessing" phase for such microinstruction. Considering, for example, program zero (PGM 0), the accessing phase occurs during time slice 1. Thus, index word zero (IW 0) and access pointer zero (AP 0) for program zero occur during time slice 1. Access pointer zero is used to access the address local storage 30 during time slice 1 and the instruction address obtained therefrom is used to access the control storage 26 during time slice 1. The accessed microinstruction is, however, not set into the operation register 53 until time slice 2. Thus, the execution of the program zero microinstruction occurs during time slice 2.

FIG. 7 also depicts a typical set of execution operations for the program zero microinstruction during time slice 2. For sake of an example, it is assumed that this microinstruction calls for the adding of an operand A to an operand B and a storing of the result. These operands are stored in a data local storage 55. The elemental control signals YL cause the address of operand A, which resides in operation register 53, to be set into data address register (DAR) 56. This accesses the operand A and control signals YL cause such operand to be set into an A register 57. In a similar fashion, operand B is read out of data local storage 55 and set into a B register 58. These operands are then added by an arithmetic and logic unit (ALU) 60 and the result is supplied to a data register 61. This result is then written back into the data local storage 55 at, for example, the storage location previously occupied by operand B. This completes the execution of this particular microinstruction for program zero. As indicated in FIG. 7, these execution steps occurred during time slice 2.

In order to simplify the understanding, there have been omitted from the timing lines F, G and I through L of FIG. 7 the signals for programs 1 and 2. Nevertheless, it is to be clearly understood that these same kinds of operations also occur for programs 1 and 2. In particular, their execution phases also occur one time slice later than their corresponding access phases.

Referring to FIG. 6, the function modification mechanism will now be considered. This mechanism includes a program list mechanism represented by a register 62 for providing a list of identifiers for those programs, in this case microprograms, having instructions, in this case microinstructions, which can be modified. Thus, assuming that all three programs are subject to modification, the PID 0 field in register 62 contains a plural-bit program identifier for program zero, the PID 1 field contains a plural-bit identifier for program 1, and the PID 2 field contains a plural-bit identifier for program 2. If a given program should not be on the list, then its PID field is left blank. In the present embodiment, it is assumed that these program identifiers in register 62 have the same format (bit length and codes) as the access pointers in the access pointer storage 46. Coupled to the program list register 62 is compare circuitry 63 which is responsive to the program identifier represented by the access pointer issued by access pointer storage 46 and supplied by way of conductor group 64 (part of bus 19) for producing on output line 65 a program compare signal (timing diagram line M of FIG. 7) if the program identified by the access pointer is on the list in register 62.

Compare circuitry 63 may have a known structure comprised of EXCLUSIVE OR gates, OR gates and NOT circuits. Each EXCLUSIVE OR circuit has two inputs. The EXCLUSIVE OR circuits are grouped wherein the number of circuits in each group corresponds to the number of bits in the access pointer on bus 64. The number of groups, in its turn, corresponds to the number of program identifiers storable in register 62. The first inputs in each group are connected to receive the access pointer bits. The second inputs in each group are connected to receive the identifier bits from a different one of the identifier fields in register 62. In this manner, the access pointer is simultaneously compared, on a bit by bit basis, with each program identifier in the register 62. An OR circuit is associated with each EXCLUSIVE OR group for receiving the outputs from the EXCLUSIVE OR circuits therein. The output of each OR circuit is then connected by way of a NOT circuit to a different input of a further OR circuit. The output of this further OR circuit is connected to the compare output line 65. This output line 65 assumes the binary one level if the access pointer on bus 64 matches any one of the program identifiers in the register 62.

The program compare signal line 65 is connected to the data input of a latch circuit 66. The clock pulse T from the clock pulse generator 52 (FIG. 5) is supplied to the set/reset input of latch circuit 66 by way of line 67. This clock pulse (timing diagram line A of FIG. 7) serves to set the latch circuit 66 if the compare output line 65 is at the binary one level and to reset the latch circuit 66 if the compare output line 65 is at the binary zero level. the time slice 1 portion of timing diagram line M shows the case where compare output line 64 is at the one level. This causes the output of latch circuit 66 (line 43) to be at the one level during time slice 2, this condition being represented by the time slice 2 portion of timing diagram line N. Thus, the latch circuit 66 serves to preserve the results of the access pointer comparison for use during the execution phase occurring during the next time slice. For sake of a name, the signal on latch output line 43 is called the program modification signal.

The function modification mechanism further includes an instruction list mechanism represented by a register 68 for providing a list of identifiers for those microinstructions which can be modified. In the present embodiment, these identifiers are given the same format as is used for the op codes in the microinstructions in control storage 26. Thus, the OP 0 field of register 68 corresponds to the op code or a first modifiable microinstruction, the OP 1 field corresponds to the op code of a second modifiable microinstruction, etc. Coupled to the instruction list register 68 is compare circuitry 69 for comparing the op code of the instruction currently being executed with those on the op code list in register 68. To this end, the op code field in operation register 53 is supplied to compare circuitry 69 by way of bus 70 (part of bus 19). Compare circuitry 69 simultaneously compares the op code on bus 70 with all the different op codes in register 68 to produce an instruction compare signal on line 44 if the op code on bus 70 matches any one of the op codes in register 68. Compare circuitry 69 may be of the same form of construction as described above for the compare circuitry 63.

The condition signal lines 17c are connected by way of OR circuitry 71 to an external register 72. As mentioned, the condition signals are, for sake of example, assumed to be provided by the I/O unit 16. Upon occurrence of a predetermined condition in the I/O unit 16, a condition signal is supplied to the interface 18 and temporarily stored in the external register 72. This condition signal is then made available on the output line 73 of the register 72.

The modification control 42 further includes logic circuitry represented by an AND circuit 74 for producing the function modification control signal on line 45 for a particular time slice interval if three prerequisites are met, namely: (1) the microinstruction to be executed during that time slice interval is on the modifiable instruction list in register 68; (2) the program to which the microinstruction belongs is on the modifiable program list in register 62; and (3) the necessary condition signal has been set into the external register 72. In other words, the program modification signal line 43, the instruction ID compare line 44 and the external condition signal line 73 must all three be at the binary one level to obtain the one level function modification control signal on line 45. This modification control signal on line 45 is supplied to the execution unit 36 to enable the desired modification of the execution of the microinstruction.

Returning to FIG. 5, the function modification mechanism further includes a modification storage mechanism represented by a modification buffer storage 75 for storing modification signals for the programs and the microinstructions belonging thereto. Thus, for each program on the modifiable program list in register 62 (FIG. 6), there is at least one set of modification signals stored in the modification storage 75 for modifying at least one microinstruction in such program. The modification storage 75 is addressed by means of the modification buffer storage address register (MBSAR) 76 which receives the current program pointer from program pointer storage 50. Thus, during any given time slice interval, the necessary set of modification signals is made available at the output of the modification storage 75. Whether or not these modification signals are used depends on the presence or absence of the modification control signal generated by the interface 18 and supplied by line 45 to control the enabling and disabling of AND circuitry 77. If the modification control signal is present on the line 45, then the AND circuitry 77 is enabled to pass the modification signals for the current time slice to a modification register 78. Register 78, in turn, drives a modification decoder 79 which produces the elemental control signals XL which switch the data flow control gates (mostly not shown) to produce the desired modification of the instruction execution.

By way of illustration, assume that one of the microinstructions in control storage 26 is a register-to-register ADD instruction for adding the contents of two operand registers located in the data local storage 55. Assume, also, that for a certain predetermined condition in the I/O unit 16 it is desired to modify the execution of this ADD instruction by arbitrarily adding a factor of +1 to the result. This, then, is accomplished by means of a +1 circuit 80 which can supply by way of a data flow control gate 81 a +1 to the carry-in line of the ALU 60. Thus, if the predetermined condition is present and the register-to-register ADD microinstruction is to be executed, the appropriate set of modification signals in modification storage 75 is set into the modification register 78 to drive the decoder 79. In this case, decoder 79 turns on its output line 82 to enable the data flow control gate 81 to pass the +1 to the ALU 60.

This foregoing example is represented in FIG. 7 at time slice interval 5 for the case of program zero. Note that the three necessary prerequisites are present, namely, the program modification signal (timing diagram line N), the instruction ID compare signal (timing diagram line O) and the external condition signal (timing diagram line P). Thus, the modification control signal (timing diagram line Q) is produced and the modification signals from modification storage 75 are set into the modification register 78. As a consequence, the ALU output (timing diagram line K) is the modified result of A+B+1. This is to be contrasted with the normal result obtained during time slice 2. In the case of time slice 2, all three prerequisites were not present and hence the execution of the instruction was not modified.

In passing, it should be noted that FIG. 7 has been kept simple by not showing any of the modification prerequisite signals (timing diagram lines M-P) for programs 1 and 2. Such signals may or may not be present depending on the particular circumstances.

A further point to note is that in the illustrated embodiment, the addressing of the modification storage 75 is shown as being a function of only the program pointer for the currently executing program. The addressing, however, can be readily extended to permit controlling the modification buffer 75 not solely as a function of the program but also as a function of the particular microinstruction being executed. In this case, each modifiable microinstruction would have its own exclusive set of modification signals in the buffer storage 75. This can be accomplished by also supplying to MBSAR 76 the op code field in the operation register 53.

In the illustrated embodiment, the program list register 62 (FIG. 6), the instruction list register 68 (FIG. 6) and the modification buffer storage 75 (FIG. 5) are preloaded prior to commencement of systems operations by means of special microinstructions loaded into control storage 26 for initialization purposes and the like. The instructions necessary for this purpose are read from the control storage 26, set into the operation register 53 and are processed in such a manner that the data local storage 55 is addressed and the required information read therefrom by means of one of the address fields in the operation register 53. Having been decoded in operation decoder 54, the op code part causes the program identifier information to be read from the data program local storage 55 and transferred to the program list register 62 via data flow control gates 83 and bus 84 if the information concerned is program identification information. For the instruction identifiers, on the other hand, the information read from the data local storage 55 is supplied under the control of the operation decoder 54 via data flow control gates 85 and bus 86 to the instruction list register 68. Similarly, the modification information for modification storage 75 is read into such storage 75 by way of data flow control gates 87. For this case, FIG. 5 shows an alternative solution insofar as, for example, the microinstruction read from the control storage 26 directly contains the required modified information, in addition to the operation code.

At this point, it is helpful to consider some representative examples of external conditions in the I/O unit 16 and their corresponding modifications of the instruction execution in the execution unit 36. As a first example, consider the +1 modification of the ADD instruction described above. This modification is useful for example, for I/O device bit string deserialization purposes. In this case, assume that the I/O device is transmitting data bits in a serial manner and it is desired to convert the data to a parallel form. This can be accomplished by means of the register-to-register ADD mircroinstruction and the +1 modification. This is accomplished by selecting a register, call it register X, in the data local storage 55 and by programming the ADD microinstruction to add register X to register X and to store the result in register X. This register X is initialized to an all-zero condition before commencement of the deserialization. The external condition signal to the modification control 42 is then derived from the incoming serial data bits. If the incoming data bit has a one value, then the condition signal is set to one and the +1 modification in the execution unit 36 is made to occur. If, on the other hand, the incoming data bit has a zero value, no condition signal is provided and the +1 modification remains disabled so that a normal register-to-register ADD will occur. In this manner, the repeated executions of the ADD microinstruction for each incoming data bit will build up in the register X a parallel representation of the complete incoming data word.

As a further example, assume that the control storage 26 includes a "load multiple byte" microinstruction which enables the transfer of eight bytes of data from an I/O external register space into the data local storage 55 using one microinstruction. This is very efficient for high speed I/O devices and the storage address updating can be accomplished automatically. The microinstruction program required for this purpose is:

(1) Branch on I/O transfer request
(2) Load eight bytes
(3) Branch to (1)

A different I/O device which is attached to the same processing unit has a much lower data rate. It offers only one byte for transfer. In this case, the microprogram would be:

(1) Branch on I/O transfer request
(2) Load eight bytes (modified function for one byte)
(3) Branch to (1)

In this case of the slow I/O device, the function of loading eight bytes is modified by loading one byte without address register updating.

The internal function modification in the processing unit involves the supression of the "register address increment" control signal and the generation of the "instruction end" control signal after only one byte of data transfer. The op code portion of the "load multiple byte" microinstruction does not change and so the decoder 54 controls the remainder of the processing unit circuitry in the normal manner. This modification is active only during the time slice assigned to the slow I/O device.

As indicated in FIG. 4, part of the function modification mechanism is located in the interface unit 18. This arrangement is particularly advantageous where the function modifications are called for primarily by external condition signals from peripheral I/O devices. If, however, a greater number of internal condition signals from within the processing unit are to be handled, then it becomes more favorable for all of the function modification mechanism to be located within the processing unit proper and not in the interface unit. Regardless of where located, the function of these modification mechanism circuits remains the same.

The hereinabove described embodiment of the invention is particularly well suited for providing dynamic time slice control whereby the time slice assignments can be dynamically changed to best meet the needs arising at any particular moment. At the same time, the function modification action operates to further advantage since a smaller amount of microinstruction code and hence a smaller control storage are required and the microprogramming is simpler and more flexible. These features and advantages are particularly desirable in the case of a small-scale low-performance data processing unit.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system, the combination comprising:

an instruction storage mechanism for storing instructions belonging to a plurality of different programs and including an address mechanism for accessing the stored instructions;

an instruction execution mechanism for receiving and executing the accessed instructions one at a time;

a time slice control mechanism for controlling the sequence in which the instructions are supplied to the execution mechanism for causing the instructions from the different programs to be executed in an interleaved manner by supplying them to the execution mechanism during interleaved time slice intervals and including circuitry for issuing a program identifier for each time slice interval and for supplying each program identifier to the instruction storage address mechanism for determining the program to be accessed during a particular time slice interval;

circuitry for supplying condition signals representing the occurrences of predetermined conditions in the data processing system;

and a function modification mechanism responsive to the occurrence of a predetermined program identifier and one of the condition signals for modifying the function of at least one of the instructions in the program identified by such program identifier.

2. A data processing system in accordance with claim 1 wherein the function modification mechanism includes:

a modification storage mechanism for storing modification signals for the programs;

and control circuitry responsive to the occurrence of a predetermined program identifier and one of the condition signals for enabling the modification storage mechanism to supply to the instruction execution mechanism during the time slice interval for the program identified by such program identifier at least one modification signal for that particular program.

3. A data processing system in accordance with claim 1 wherein the function modification mechanism includes:

a program list mechanism for providing a list of identifiers for those programs having instructions which can be modified;

compare circuitry coupled to the program list mechanism and responsive to the program identifier issued by the time slice control mechanism for producing a program compare signal if the identified program is on the list;

and circuitry responsive to the occurrence of the program compare signal and one of the condition signals for modifying the normal function of at least one of the instructions in the identified program.

4. A data processing system in accordance with claim 1 wherein the function modification mechanism includes:

an instruction list mechanism for providing a list of identifiers for those instructions which can be modified;

compare circuitry coupled to the instruction list mechanism and responsive to the accessed instruction for producing an instruction compare signal if the accessed instruction is on the list;

and circuitry responsive to the occurrence of the instruction compare signal and one of the condition signals for modifying the normal function of the accessed instruction.

5. A data processing system in accordance with claim 2 wherein the function modification mechanism further includes:

an instruction list mechanism for providing a list of identifiers for those instructions which can be modified;

compare circuitry coupled to the instruction list mechanism and responsive to the accessed instruction for producing an instruction compare signal if the accessed instruction is on the list;

and wherein the control circuitry is responsive to the occurrence of the program identifier, the instruction compare signal and one of the condition signals for enabling the modification storage mechanism to supply to the instruction execution mechanism during the time slice interval for the identified instruction at least one modification signal for that particular instruction.

6. A data processing system in accordance with claim 3 wherein the function modification mechanism further includes:

an instruction list mechanism for providing a list of identifiers for those instructions which can be modified;

compare circuitry coupled to the instruction list mechanism and responsive to the accessed instruction for producing an instruction compare signal if the accessed instruction is on the list;

and wherein the circuitry responsive to the program compare signal and the condition signal is also responsive to the instruction compare signal for modifying in particular the normal function of the accessed instruction.

* * * * *